Figure 1:
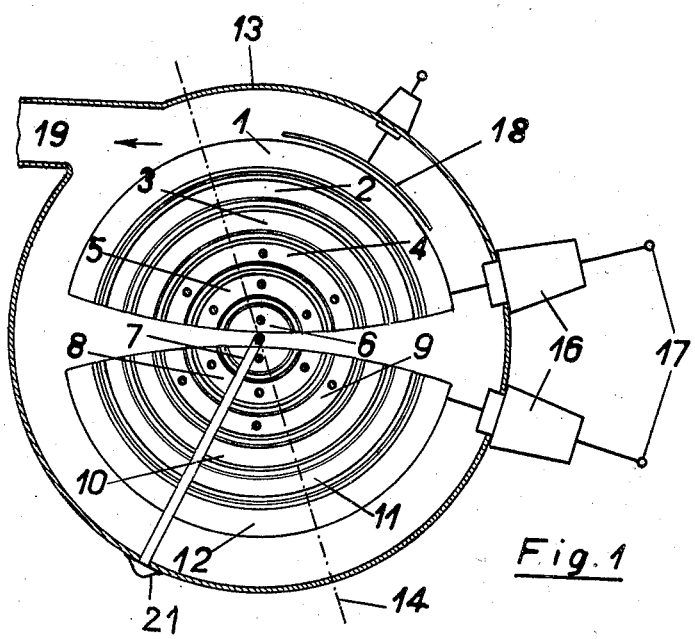

Jan. 21, 1941. J. JONAS 2,229,572
CYCLOTRON
Filed Nov. 25, 1939

Inventor:
Julius Jonas,
by Potter, Pierce & Scheffler,
Attorneys.

Patented Jan. 21, 1941

2,229,572

UNITED STATES PATENT OFFICE 2,229,572

CYCLOTRON

Julius Jonas, Zurich, Switzerland, assignor to Aktiengesellschaft Brown, Boverie & Cie., Baden, Switzerland Application November 25, 1939, Serial No. 306,153
In Switzerland December 5, 1938

2 Claims. (Cl. 250—27.5)

As is known, a cyclotron is used to give electrically charged particles, such as electrons and ions, high velocities which are equivalent to the speed which the particle or charge carrier would have if it was accelerated through a static potential of several million volts. The great advantage which the cyclotron possesses when compared with an ordinary high voltage plant is that only very small voltages of about 20,000 to 100,000 volts are necessary in order to produce very high velocities for the charge carriers. The cyclotron construction as it is known per se, comprises a two-part hollow metal vessel in the form of a circular box which is divided into two halves along a diameter, the separate parts being arranged a certain distance apart in a vacuum chamber. The vacuum chamber containing the two box halves is situated in the air gap of a powerfully direct current excited electro-magnet, the homogeneous field of which permeates the parts of the box perpendicularly to their semi-circular surfaces. Each half of the box is connected to the pole of a high frequency generator and in the centre of the space enclosed by the surfaces of the box by means of special devices charge carriers are produced which under the influence of the alternating electric field and the constant magnetic field are moved in spiral paths with an outwardly increasing velocity. When the charge carriers have acquired a certain maximum travel radius and a corresponding velocity any further increase in the travel radius results in their being seized by a constant electric voltage which diverts them out of the range of the magnetic field into the observation chamber. Although it should be possible to obtain speeds of over 20 million volts with a cyclotron, up to the present, for some inexplicable reason, it has not been possible to reach velocities higher than 4 million volts.

These obvious disadvantages are mainly due to the fact that in the known construction of cyclotron the relativistic mass variability of the charge carriers has been neglected. In accordance with the invention in order to compensate the retardation in acceleration caused by the increase in mass of the charge carriers accelerated to very high speeds, measures are adopted whereby the electrical field increases from the centre to the rim of the chamber to the extent necessary to obtain equal times for all revolutions of the accelerated charge carriers. A constructional example of a cyclotron built according to the invention will now be explained in greater detail. According to this constructional example both semi-circular surfaces of each half of the box are divided into semi-annular strips, insulated from one another, and subjected to such alternating electric potentials that their peak value increases from the centre of the box towards the rim. For controlling the potential, condensers are connected between the insulated strips, the capacities being so selected that when the pole of the voltage source is connected to the outside strip of the box half, the voltage drop from the rim to the centre of the box follows the desired course.

The method of operation of this arrangement is as follows. The times of revolution of a charge carrier accelerated by the cyclotron must be as far as possible equal for both small and large travel radii, because otherwise the synchronous travel of the charge carrier with the circuit frequency of the alternating voltage applied to the two halves of the box, will be disturbed. The charge carrier then falls out of step and does not absorb any more kinetic energy, and under certain circumstances may even lose energy, with the result that the final speed which can be achieved no longer has the high value desired. One reason why the charge carriers fall out of step is that the relativistic mass increase at high speeds causes the energy transmitted from the electrical field to the charge carriers to be no longer entirely used for acceleration purposes, as was the case at low speeds, but also to a large extent for increasing the mass. This mass increase causes a certain retardation during each revolution and this is compensated in the manner described by the accelerating electric field increasing towards the rim by a corresponding amount. The arrangement is furthermore constructed in such a manner that the accelerating voltages increase towards the rim so that the time during which the charge carrier is accelerated is so shortened that the influence of the aforementioned retardation is compensated. The charge carrier therefore does not fall out of step at high speeds and the correct operation of the cyclotron is assured.

Figure 2:
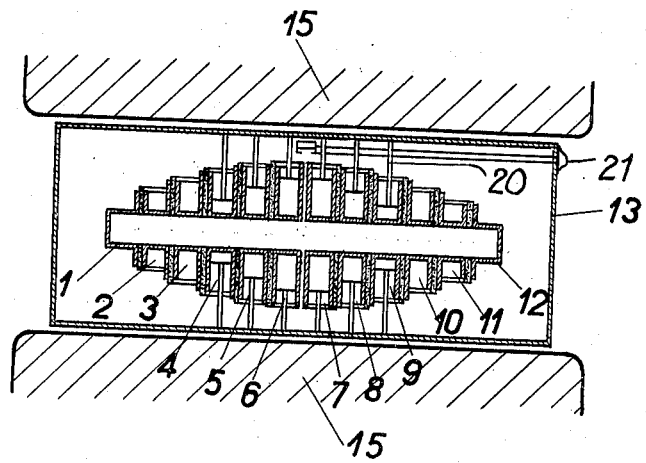

The constructional example of the invention illustrated in the accompanying drawing shows in Fig. 1 a sectional view of the accelerating chamber perpendicular to the magnetic field, whilst Fig. 2 shows a sectional view parallel to the direction of the magnetic field. The view shown in Fig. 2 corresponds approximately to a section on a plane perpendicular to the line 14 in Fig. 1. In both figures the same parts are designated by the same reference numerals.

Between the two magnet poles 15 is the accelerating chamber, the wall 13 of which forms a vacuum-tight seal between the inside space and the atmosphere. The casing 13 is equipped with bushing insulators 16 which serve to lead in the high frequency voltage from the terminals 17. In the usual form of cyclotron this high frequency voltage is applied to both halves of a box in the inside of which the charge carriers to be accelerated describe spiral paths from the inside to the outside with a steadily increasing travel radius, until they are diverted by an auxiliary electrode 18 into the observation space 19. In the cyclotron according to the invention the semi-circular surfaces of each box part are divided up into a number of annular rings or sectors which are insulated from each other. The annular sectors 1 to 6 in Fig. 1 form for instance the upper semi-circular surface of one half of the box and annular sectors 7 to 12 the upper surface of the other half of the box. The lower semi-circular surfaces of the box halves are divided in a corresponding manner into the annular sectors shown in Fig. 2. The sectors are so arranged that each upper annular sector is located opposite to an identical one on the lower surface. Only the upper and lower surfaces of both the outside annular sectors 1 and 12 are conductively connected together and both these electrodes are therefore connected to the high frequency leads. The transmission of the high frequency voltage from both the outside electrodes to the inside electrodes, which each consist of two parts, is preferably undertaken capacitively. For this purpose the electrodes 1 to 12 can be connected together through capacities in the sequence of their diameters. For instance the outside electrode 1 is connected through equal capacities with both sector shaped parts of the electrode 2; both these latter parts are then each connected through a further capacity with the parts of the electrode 3 and so on until the last electrode 12 is reached. Instead of using additional capacities each annular sector 1 to 12 can be provided with flanges of certain length which form a capacity with the flanges of the adjacent annular sector. The height and length of these flanges determines the value of the mutual capacity, as can be seen from Fig. 2. The annular sectors which form the electrodes are fixed to the casing 13 by means of the supports 20 made of insulating material. These supports are shown in the drawing, Fig. 2, for the electrodes 4 to 9. The remaining electrodes 1, 2, 3 and 10, 11, 12 preferably support each other by means of intermediate insulation pieces which can also serve as the dielectric between the flanges. The outside electrodes 1 and 12 are also fixed to the high frequency bushing insulators 16. Such a capacity control of the electrodes 1 to 12 enables the high frequency voltages in both the gaps between the electrodes 6 and 7 to have an average amplitude, whilst in the gaps between the electrodes 5 and 8, 4 and 9, 3 and 10, 2 and 11, 1 and 12, the amplitude assumes increasing values. For the charge carriers which are to be accelerated the time taken to travel across the gap will thus become increasingly smaller, so that by means of this gain in time the retardation caused by the relativistic mass increase will be compensated within wide limits. Considerably higher end speeds can therefore be attained because the charge carriers do not fall out of step so easily as is usually the case with the cyclotron used hitherto.

Although but one embodiment of the present invention has been illustrated and described, it will be apparent to those skilled in the art that various changes and modifications may be made without departing from the spirit of the invention or the scope of the appended claims.

It is claimed and desired to secure by Letters Patent:

1. In the method of accelerating charged particles which comprises subjecting the charged particles to the accelerating action of an oscillating electric field and causing the charged particles to travel in a plurality of revolutions by the action of a magnetic field thereon, the magnetic field being of such strength that the period of one-half revolution of the charged particles in the electric field synchronizes with the period of oscillation of the electric field whereby the charged particles are caused to repeatedly traverse the oscillating field in the direction of acceleration of the field and are thus subjected to repeated acceleration, the improvement which comprises progressively increasing the strength of the electric field from the center to the outer portion thereof by an amount equivalent to the retardation of acceleration of the charged particles due to the relativistic mass increase of the charged particles at extremely high velocities.

2. In apparatus for accelerating charged particles comprising opposing hollow electrodes having their hollow portions facing each other, means for supplying charged particles in the space between the electrodes, means for maintaining an electric field between said electrodes to cause said charged particles to move in said field and into the hollow portions of the electrodes, magnetizing means for producing a magnetic field in the paths of the charged particles to cause the charged particles to move in curved paths between and within the electrodes and to cause the charged particles to repeatedly traverse the electric field, means for causing oscillations of the electric field in resonance with the revolutions of the charged particles between the electrodes to cause repeated acceleration of the charged particles in successive revolutions thereof, said hollow electrodes comprising concentric mutually insulated semi-annular strips and condensers connected between said strips, said condensers having capacities such that the voltage applied to the outermost strips of the electrodes is decreased from strip to strip in an amount equivalent to the retardation of acceleration of the charged particles due to the relativistic mass increase of the charged particles at extremely high velocities.

JULIUS JONAS.